United States Patent
TenHouten et al.

(10) Patent No.: US 12,194,674 B2
(45) Date of Patent: Jan. 14, 2025

(54) MULTI-MATERIAL POWDER BED FUSION 3-D PRINTER

(71) Applicant: DIVERGENT TECHNOLOGIES, INC., Los Angeles, CA (US)

(72) Inventors: Broc William TenHouten, Los Angeles, CA (US); Eahab Nagi El Naga, Los Angeles, CA (US); John Russell Bucknell, Los Angeles, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 660 days.

(21) Appl. No.: 16/792,113

(22) Filed: Feb. 14, 2020

(65) Prior Publication Data
US 2021/0252780 A1    Aug. 19, 2021

(51) Int. Cl.
*B29C 64/393*    (2017.01)
*B29C 64/129*    (2017.01)
(Continued)

(52) U.S. Cl.
CPC .......... *B29C 64/129* (2017.08); *B29C 64/153* (2017.08); *B29C 64/209* (2017.08);
(Continued)

(58) Field of Classification Search
CPC ... B29C 64/153; B29C 64/255; B29C 64/295; B29C 64/209; B29C 64/393;
(Continued)

(56) References Cited

U.S. PATENT DOCUMENTS

| | | |
|---|---|---|
| 5,203,226 A | 4/1993 | Hongou et al. |
| 5,742,385 A | 4/1998 | Champa |

(Continued)

FOREIGN PATENT DOCUMENTS

| | | |
|---|---|---|
| WO | 1996036455 A1 | 11/1996 |
| WO | 1996036525 A1 | 11/1996 |

(Continued)

OTHER PUBLICATIONS

US 9,202,136 B2, 12/2015, Schmidt et al. (withdrawn)
US 9,809,265 B2, 11/2017, Kinjo (withdrawn)
US 10,449,880 B2, 10/2019, Mizobata et al. (withdrawn)

*Primary Examiner* — Jamel M Nelson
(74) *Attorney, Agent, or Firm* — ARENTFOX SCHIFF LLP

(57) ABSTRACT

A multi-material three-dimensional (3-D) powder bed fusion-based (PBF) printer is disclosed. In one aspect, the 3-D PBF includes a body, a controller coupled to the body, a plurality of cartridges coupled to a print nozzle, an energy source coupled to an upper surface of the body, a deflector for deflecting an energy beam from the energy source, and a build plate on which a build piece can be 3-D printed. Each cartridge may include a slurry in which a specific print material or alloy is suspended. A depositor may selectively deposit the slurry onto the build plate to form a plurality of consecutive layers. For a given layer or a given region thereof, the controller may selectively deposit different amounts of the slurry to produce an alloy having a desired composition. A heating element may be used to vaporize the solvent in the deposited slurry. Using the deflector, the energy source can fuse the regions to sinter the deposited material and in some embodiments, to vaporize the solvent prior to sintering. In other embodiments, the slurries may include different alloys that can be selectively distributed (Continued)

across the layers to form a build piece having desired material characteristics.

25 Claims, 9 Drawing Sheets

(51) Int. Cl.
*B29C 64/153* (2017.01)
*B29C 64/209* (2017.01)
*B29C 64/255* (2017.01)
*B29C 64/268* (2017.01)
*B29C 64/295* (2017.01)
*B33Y 10/00* (2015.01)
*B33Y 30/00* (2015.01)
*B33Y 40/10* (2020.01)
*B33Y 50/02* (2015.01)

(52) U.S. Cl.
CPC .......... *B29C 64/255* (2017.08); *B29C 64/268* (2017.08); *B29C 64/295* (2017.08); *B29C 64/393* (2017.08); *B33Y 10/00* (2014.12); *B33Y 30/00* (2014.12); *B33Y 40/10* (2020.01); *B33Y 50/02* (2014.12)

(58) Field of Classification Search
CPC ... B29C 64/129; B29C 64/268; B29C 64/124; B29C 64/135; B33Y 10/00; B33Y 30/00; B33Y 50/02; B33Y 40/10
See application file for complete search history.

(56) References Cited

U.S. PATENT DOCUMENTS

| | | |
|---|---|---|
| 5,990,444 A | 11/1999 | Costin |
| 6,010,155 A | 1/2000 | Rinehart |
| 6,096,249 A | 8/2000 | Yamaguchi |
| 6,140,602 A | 10/2000 | Costin |
| 6,250,533 B1 | 6/2001 | Otterbein et al. |
| 6,252,196 B1 | 6/2001 | Costin et al. |
| 6,318,642 B1 | 11/2001 | Goenka et al. |
| 6,365,057 B1 | 4/2002 | Whitehurst et al. |
| 6,391,251 B1 | 5/2002 | Keicher et al. |
| 6,409,930 B1 | 6/2002 | Whitehurst et al. |
| 6,468,439 B1 | 10/2002 | Whitehurst et al. |
| 6,554,345 B2 | 4/2003 | Jonsson |
| 6,585,151 B1 | 7/2003 | Ghosh |
| 6,644,721 B1 | 11/2003 | Miskech et al. |
| 6,811,744 B2 | 11/2004 | Keicher et al. |
| 6,866,497 B2 | 3/2005 | Saiki |
| 6,919,035 B1 | 7/2005 | Clough |
| 6,926,970 B2 | 8/2005 | James et al. |
| 7,152,292 B2 | 12/2006 | Hohmann et al. |
| 7,344,186 B1 | 3/2008 | Hausler et al. |
| 7,500,373 B2 | 3/2009 | Quell |
| 7,586,062 B2 | 9/2009 | Heberer |
| 7,637,134 B2 | 12/2009 | Burzlaff et al. |
| 7,710,347 B2 | 5/2010 | Gentilman et al. |
| 7,716,802 B2 | 5/2010 | Stern et al. |
| 7,745,293 B2 | 6/2010 | Yamazaki et al. |
| 7,766,123 B2 | 8/2010 | Sakurai et al. |
| 7,852,388 B2 | 12/2010 | Shimizu et al. |
| 7,908,922 B2 | 3/2011 | Zarabadi et al. |
| 7,951,324 B2 | 5/2011 | Naruse et al. |
| 8,094,036 B2 | 1/2012 | Heberer |
| 8,163,077 B2 | 4/2012 | Eron et al. |
| 8,286,236 B2 | 10/2012 | Jung et al. |
| 8,289,352 B2 | 10/2012 | Vartanian et al. |
| 8,297,096 B2 | 10/2012 | Mizumura et al. |
| 8,354,170 B1 | 1/2013 | Henry et al. |
| 8,383,028 B2 | 2/2013 | Lyons |
| 8,408,036 B2 | 4/2013 | Reith et al. |
| 8,429,754 B2 | 4/2013 | Jung et al. |
| 8,437,513 B1 | 5/2013 | Derakhshani et al. |
| 8,444,903 B2 | 5/2013 | Lyons et al. |
| 8,452,073 B2 | 5/2013 | Taminger et al. |
| 8,599,301 B2 | 12/2013 | Dowski, Jr. et al. |
| 8,606,540 B2 | 12/2013 | Haisty et al. |
| 8,610,761 B2 | 12/2013 | Haisty et al. |
| 8,631,996 B2 | 1/2014 | Quell et al. |
| 8,675,925 B2 | 3/2014 | Derakhshani et al. |
| 8,678,060 B2 | 3/2014 | Dietz et al. |
| 8,686,314 B2 | 4/2014 | Schneegans et al. |
| 8,686,997 B2 | 4/2014 | Radet et al. |
| 8,694,284 B2 | 4/2014 | Berard |
| 8,720,876 B2 | 5/2014 | Reith et al. |
| 8,752,166 B2 | 6/2014 | Jung et al. |
| 8,755,923 B2 | 6/2014 | Farahani et al. |
| 8,787,628 B1 | 7/2014 | Derakhshani et al. |
| 8,818,771 B2 | 8/2014 | Gielis et al. |
| 8,873,238 B2 | 10/2014 | Wilkins |
| 8,978,535 B2 | 3/2015 | Ortiz et al. |
| 9,006,605 B2 | 4/2015 | Schneegans et al. |
| 9,071,436 B2 | 6/2015 | Jung et al. |
| 9,101,979 B2 | 8/2015 | Hofmann et al. |
| 9,104,921 B2 | 8/2015 | Derakhshani et al. |
| 9,126,365 B1 | 9/2015 | Mark et al. |
| 9,128,476 B2 | 9/2015 | Jung et al. |
| 9,138,924 B2 | 9/2015 | Yen |
| 9,149,988 B2 | 10/2015 | Mark et al. |
| 9,156,205 B2 | 10/2015 | Mark et al. |
| 9,186,848 B2 | 11/2015 | Mark et al. |
| 9,244,986 B2 | 1/2016 | Karmarkar |
| 9,248,611 B2 | 2/2016 | Divine et al. |
| 9,254,535 B2 | 2/2016 | Buller et al. |
| 9,266,566 B2 | 2/2016 | Kim |
| 9,269,022 B2 | 2/2016 | Rhoads et al. |
| 9,327,452 B2 | 5/2016 | Mark et al. |
| 9,329,020 B1 | 5/2016 | Napoletano |
| 9,332,251 B2 | 5/2016 | Haisty et al. |
| 9,346,127 B2 | 5/2016 | Buller et al. |
| 9,389,315 B2 | 7/2016 | Bruder et al. |
| 9,399,256 B2 | 7/2016 | Buller et al. |
| 9,403,235 B2 | 8/2016 | Buller et al. |
| 9,418,193 B2 | 8/2016 | Dowski, Jr. et al. |
| 9,457,514 B2 | 10/2016 | Schwärzler |
| 9,469,057 B2 | 10/2016 | Johnson et al. |
| 9,478,063 B2 | 10/2016 | Rhoads et al. |
| 9,481,402 B1 | 11/2016 | Muto et al. |
| 9,486,878 B2 | 11/2016 | Buller et al. |
| 9,486,960 B2 | 11/2016 | Paschkewitz et al. |
| 9,502,993 B2 | 11/2016 | Deng |
| 9,525,262 B2 | 12/2016 | Stuart et al. |
| 9,533,526 B1 | 1/2017 | Nevins |
| 9,555,315 B2 | 1/2017 | Aders |
| 9,555,580 B1 | 1/2017 | Dykstra et al. |
| 9,557,856 B2 | 1/2017 | Send et al. |
| 9,566,742 B2 | 2/2017 | Keating et al. |
| 9,566,758 B2 | 2/2017 | Cheung et al. |
| 9,573,193 B2 | 2/2017 | Buller et al. |
| 9,573,225 B2 | 2/2017 | Buller et al. |
| 9,586,290 B2 | 3/2017 | Buller et al. |
| 9,595,795 B2 | 3/2017 | Lane et al. |
| 9,597,843 B2 | 3/2017 | Stauffer et al. |
| 9,600,929 B1 | 3/2017 | Young et al. |
| 9,609,755 B2 | 3/2017 | Coull et al. |
| 9,610,737 B2 | 4/2017 | Johnson et al. |
| 9,611,667 B2 | 4/2017 | GangaRao et al. |
| 9,616,623 B2 | 4/2017 | Johnson et al. |
| 9,626,487 B2 | 4/2017 | Jung et al. |
| 9,626,489 B2 | 4/2017 | Nilsson |
| 9,643,361 B2 | 5/2017 | Liu |
| 9,662,840 B1 | 5/2017 | Buller et al. |
| 9,665,182 B2 | 5/2017 | Send et al. |
| 9,672,389 B1 | 6/2017 | Mosterman et al. |
| 9,672,550 B2 | 6/2017 | Apsley et al. |
| 9,676,145 B2 | 6/2017 | Buller et al. |
| 9,684,919 B2 | 6/2017 | Apsley et al. |
| 9,688,032 B2 | 6/2017 | Kia et al. |
| 9,690,286 B2 | 6/2017 | Hovsepian et al. |
| 9,700,966 B2 | 7/2017 | Kraft et al. |
| 9,703,896 B2 | 7/2017 | Zhang et al. |
| 9,713,903 B2 | 7/2017 | Paschkewitz et al. |

(56) References Cited

U.S. PATENT DOCUMENTS

| | | |
|---|---|---|
| 9,718,302 B2 | 8/2017 | Young et al. |
| 9,718,434 B2 | 8/2017 | Hector, Jr. et al. |
| 9,724,877 B2 | 8/2017 | Flitsch et al. |
| 9,724,881 B2 | 8/2017 | Johnson et al. |
| 9,725,178 B2 | 8/2017 | Wang |
| 9,731,730 B2 | 8/2017 | Stiles |
| 9,731,773 B2 | 8/2017 | Gami et al. |
| 9,741,954 B2 | 8/2017 | Bruder et al. |
| 9,747,352 B2 | 8/2017 | Karmarkar |
| 9,764,415 B2 | 9/2017 | Seufzer et al. |
| 9,764,520 B2 | 9/2017 | Johnson et al. |
| 9,765,226 B2 | 9/2017 | Dain |
| 9,770,760 B2 | 9/2017 | Liu |
| 9,773,393 B2 | 9/2017 | Velez |
| 9,776,234 B2 | 10/2017 | Schaafhausen et al. |
| 9,782,936 B2 | 10/2017 | Glunz et al. |
| 9,783,324 B2 | 10/2017 | Embler et al. |
| 9,783,977 B2 | 10/2017 | Alqasimi et al. |
| 9,789,548 B2 | 10/2017 | Golshany et al. |
| 9,789,922 B2 | 10/2017 | Dosenbach et al. |
| 9,796,137 B2 | 10/2017 | Zhang et al. |
| 9,802,108 B2 | 10/2017 | Aders |
| 9,809,977 B2 | 11/2017 | Carney et al. |
| 9,817,922 B2 | 11/2017 | Glunz et al. |
| 9,818,071 B2 | 11/2017 | Jung et al. |
| 9,821,339 B2 | 11/2017 | Paschkewitz et al. |
| 9,821,411 B2 | 11/2017 | Buller et al. |
| 9,823,143 B2 | 11/2017 | Twelves, Jr. et al. |
| 9,829,564 B2 | 11/2017 | Bruder et al. |
| 9,846,933 B2 | 12/2017 | Yuksel |
| 9,854,828 B2 | 1/2018 | Langeland |
| 9,858,604 B2 | 1/2018 | Apsley et al. |
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |
| 9,879,981 B1 | 1/2018 | Dehghan Niri et al. |
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |

(56) References Cited

U.S. PATENT DOCUMENTS

| | | |
|---|---|---|
| 10,257,499 B2 | 4/2019 | Hintz et al. |
| 10,259,044 B2 | 4/2019 | Buller et al. |
| 10,268,181 B1 | 4/2019 | Nevins |
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Fetfatsidis et al. |
| 10,286,452 B2 | 5/2019 | Buller et al. |
| 10,286,603 B2 | 5/2019 | Buller et al. |
| 10,286,961 B2 | 5/2019 | Hillebrecht et al. |
| 10,289,263 B2 | 5/2019 | Troy et al. |
| 10,289,875 B2 | 5/2019 | Singh et al. |
| 10,291,193 B2 | 5/2019 | Dandu et al. |
| 10,294,552 B2 | 5/2019 | Liu et al. |
| 10,294,982 B2 | 5/2019 | Gabrys et al. |
| 10,295,989 B1 | 5/2019 | Nevins |
| 10,303,159 B2 | 5/2019 | Czinger et al. |
| 10,307,824 B2 | 6/2019 | Kondoh |
| 10,310,197 B1 | 6/2019 | Droz et al. |
| 10,313,651 B2 | 6/2019 | Trevor et al. |
| 10,315,252 B2 | 6/2019 | Mendelsberg et al. |
| 10,336,050 B2 | 7/2019 | Susnjara |
| 10,337,542 B2 | 7/2019 | Hesslewood et al. |
| 10,337,952 B2 | 7/2019 | Bosetti et al. |
| 10,339,266 B2 | 7/2019 | Urick et al. |
| 10,343,330 B2 | 7/2019 | Evans et al. |
| 10,343,331 B2 | 7/2019 | McCall et al. |
| 10,343,355 B2 | 7/2019 | Evans et al. |
| 10,343,724 B2 | 7/2019 | Polewarczyk et al. |
| 10,343,725 B2 | 7/2019 | Martin et al. |
| 10,350,823 B2 | 7/2019 | Rolland et al. |
| 10,356,341 B2 | 7/2019 | Holzer et al. |
| 10,356,395 B2 | 7/2019 | Holzer et al. |
| 10,357,829 B2 | 7/2019 | Spink et al. |
| 10,357,957 B2 | 7/2019 | Buller et al. |
| 10,359,756 B2 | 7/2019 | Newell et al. |
| 10,369,629 B2 | 8/2019 | Mendelsberg et al. |
| 10,382,739 B1 | 8/2019 | Rusu et al. |
| 10,384,393 B2 | 8/2019 | Xu et al. |
| 10,384,416 B2 | 8/2019 | Cheung et al. |
| 10,389,410 B2 | 8/2019 | Brooks et al. |
| 10,391,710 B2 * | 8/2019 | Mondesir ............... B33Y 50/00 |
| 10,392,097 B2 | 8/2019 | Pham et al. |
| 10,392,131 B2 | 8/2019 | Deck et al. |
| 10,393,315 B2 | 8/2019 | Tyan |
| 10,400,080 B2 | 9/2019 | Ramakrishnan et al. |
| 10,401,832 B2 | 9/2019 | Snyder et al. |
| 10,403,009 B2 | 9/2019 | Mariampillai et al. |
| 10,406,750 B2 | 9/2019 | Barton et al. |
| 10,412,283 B2 | 9/2019 | Send et al. |
| 10,416,095 B2 | 9/2019 | Herbsommer et al. |
| 10,421,496 B2 | 9/2019 | Swayne et al. |
| 10,421,863 B2 | 9/2019 | Hasegawa et al. |
| 10,422,478 B2 | 9/2019 | Leachman et al. |
| 10,425,793 B2 | 9/2019 | Sankaran et al. |
| 10,427,364 B2 | 10/2019 | Alves |
| 10,429,006 B2 | 10/2019 | Tyan et al. |
| 10,434,573 B2 | 10/2019 | Buller et al. |
| 10,435,185 B2 | 10/2019 | Divine et al. |
| 10,435,773 B2 | 10/2019 | Liu et al. |
| 10,436,038 B2 | 10/2019 | Buhler et al. |
| 10,438,407 B2 | 10/2019 | Pavanaskar et al. |
| 10,440,351 B2 | 10/2019 | Holzer et al. |
| 10,442,002 B2 | 10/2019 | Benthien et al. |
| 10,442,003 B2 | 10/2019 | Symeonidis et al. |
| 10,449,696 B2 | 10/2019 | Elgar et al. |
| 10,449,737 B2 | 10/2019 | Johnson et al. |
| 10,461,810 B2 | 10/2019 | Cook et al. |
| 2006/0108783 A1 | 5/2006 | Ni et al. |
| 2014/0277669 A1 | 9/2014 | Nardi et al. |
| 2017/0113344 A1 | 4/2017 | Schönberg |
| 2017/0341309 A1 | 11/2017 | Piepenbrock et al. |
| 2018/0001556 A1 * | 1/2018 | Buller ............... B29C 64/386 |
| 2020/0031057 A1 * | 1/2020 | Yan ............... B33Y 10/00 |
| 2021/0354200 A1 * | 11/2021 | Nauka ............... B22F 10/38 |

FOREIGN PATENT DOCUMENTS

| | | |
|---|---|---|
| WO | 1996038260 A1 | 12/1996 |
| WO | 2003024641 A1 | 3/2003 |
| WO | 2004108343 A1 | 12/2004 |
| WO | 2005093773 A1 | 10/2005 |
| WO | 2007003375 A1 | 1/2007 |
| WO | 2007110235 A1 | 10/2007 |
| WO | 2007110236 A1 | 10/2007 |
| WO | 2008019847 A1 | 2/2008 |
| WO | 2007128586 A3 | 6/2008 |
| WO | 2008068314 A2 | 6/2008 |
| WO | 2008086994 A1 | 7/2008 |
| WO | 2008087024 A1 | 7/2008 |
| WO | 2008107130 A1 | 9/2008 |
| WO | 2008138503 A1 | 11/2008 |
| WO | 2008145396 A1 | 12/2008 |
| WO | 2009083609 A2 | 7/2009 |
| WO | 2009098285 A1 | 8/2009 |
| WO | 2009112520 A1 | 9/2009 |
| WO | 2009135938 A1 | 11/2009 |
| WO | 2009140977 A1 | 11/2009 |
| WO | 2010125057 A2 | 11/2010 |
| WO | 2010125058 A1 | 11/2010 |
| WO | 2010142703 A2 | 12/2010 |
| WO | 2011032533 A1 | 3/2011 |
| WO | 2014016437 A1 | 1/2014 |
| WO | 2014187720 A1 | 11/2014 |
| WO | 2014195340 A1 | 12/2014 |
| WO | 2015193331 A1 | 12/2015 |
| WO | 2016116414 A1 | 7/2016 |
| WO | 2017036461 A1 | 3/2017 |
| WO | 2019103248 A1 | 2/2019 |
| WO | 2019042504 A1 | 3/2019 |
| WO | 2019048010 A1 | 3/2019 |
| WO | 2019048498 A1 | 3/2019 |
| WO | 2019048680 A1 | 3/2019 |
| WO | 2019048682 A1 | 3/2019 |

* cited by examiner

MULTI-MATERIAL POWDER BED FUSION 3-D PRINTER

BACKGROUND

Field

The present disclosure relates generally to three-dimensional (3-D) printers, and more specifically to a technique for integrating multiple materials in a 3-D printed part.

Background

Additive manufacturing (AM) has provided a significant evolutionary step in the development and manufacture of wide varieties of mechanical structures and assemblies used in different industries. Being non-design specific, AM allows manufacturers to use 3-D printers instead of complex machining equipment to produce a wide variety of structures having diverse geometrical shapes and material characteristics more efficiently and at a lower cost. For this reason it is expected that conventional powder-based fusion (PBF) three-dimensional (3-D) printers and other AM technologies will soon become ubiquitous in automobile, aircraft, aerospace, ship-building and other industries that rely heavily on the use of complex and varied mechanical parts.

PBF 3-D printers can produce metallic build pieces based on 3-D data models using a metal or metal alloy powder inserted in a hopper. The material is deposited in layers on a printer build plate. The layers are selectively fused per controller instructions by a laser or other energy source. The fused regions of each layer become solidified to produce a completed part, with the remaining regions of powder later removed from the 3-D printer.

Conventional PBF 3-D printers generally use a print material such as a metal alloy in powder form to render the build piece. The resulting build piece is necessarily limited to that material. However, to meet the increasing demands of complex projects in evolving industries like those identified above, manufacturers are also increasing the sophistication of the constituent components. Components are commonly designed, for example, to include a combination of different materials.

Existing 3-D print technology generally requires that such combination structures be printed using multiple steps, between which the print material, the 3-D printer, or the manufacturing method is changed. This solution lacks efficiency. Furthermore, the use of multiple steps with different print materials can result in discrete spatial gradients of material characteristics between regions of the different materials. Particularly where such gradients represent an unintended artifact of the 3-D print process, they may compromise the integrity of the printed structure.

SUMMARY

Several aspects of a multi-material 3-D printer are more fully hereinafter with reference to various illustrative aspects of the present disclosure.

In one aspect of the disclosure, a three-dimension (3D) printer includes a build plate to support a build piece, a plurality of containers, each container including a slurry including a different print material, one or more nozzles, each nozzle coupled to one or more of the plurality of containers, at least one energy source, and a controller configured to control the one or more nozzles to deposit a layer comprising one or more of the different print materials and to control the at least one energy source to sinter at least a portion of the one or more different print materials in each layer to produce the build piece.

In another aspect of the disclosure, a method for three-dimensional (3D) printing includes controlling one or more nozzles, the one or more nozzles being coupled to a plurality of containers, each container containing a slurry including a different print material, wherein the one or more nozzles are controlled to deposit a plurality of layers comprising one or more of the different print materials, and controlling at least one energy source to sinter at least a portion of the one or more different print materials in each layer to produce a build piece.

In yet another aspect of the disclosure, a three-dimensional (3D) printer includes a three-dimensional (3-D) printer including a chamber having a build plate and at least one energy source, a plurality of cartridges, each cartridge comprising a slurry having a different print material, at least one print head comprising a plurality of nozzles, each nozzle coupled to one of the plurality of cartridges, and a controller configured to direct the at least one print head to deposit the one or more different print materials layer-by-layer and to sinter the one or more different print materials using the at least one energy source.

It will be understood that other aspects of the disclosure will become readily apparent to those skilled in the art based on the following detailed description, wherein they are shown and described in only several embodiments by way of illustration. As will be appreciated by those skilled in the art, these features, structures, methods and techniques can be realized with other embodiments without departing from the spirit and scope of the invention. Accordingly, the drawings and detailed description are to be regarded as illustrative in nature and not as restrictive.

BRIEF DESCRIPTION OF THE DRAWINGS

Various illustrations of aspects of the present disclosure will now be presented in the detailed description by way of example, and not by way of limitation, in the accompanying drawings, wherein.

DETAILED DESCRIPTION

The detailed description set forth below in connection with the drawings is intended to provide a description of exemplary embodiments of the present invention. The description is not intended to represent the only embodiments in which the invention may be practiced. The terms "exemplary" and "example" used throughout this disclosure mean "serving as an example, instance, or illustration," and should not necessarily be construed as preferred or advantageous over other embodiments presented in this disclosure. The detailed description includes specific details for the purpose of providing a thorough and complete disclosure that fully conveys the scope of the invention to those skilled in the art. However, the invention may be practiced without these specific details. In some instances, well-known structures and components may be shown in block diagram form, or may be shown not drawn to scale, or omitted entirely, in order to avoid obscuring the various concepts presented throughout this disclosure.

Additive Manufacturing (3-D Printing). A variety of different AM techniques have been used to 3-D print components composed of various types of materials. Numerous available techniques exist, and more are being developed. For example, Directed Energy Deposition (DED) AM systems use directed energy sourced from laser or electron beams to melt metal. These systems utilize both powder and wire feeds. The wire feed systems advantageously have higher deposition rates than other prominent AM techniques. Single Pass Jetting (SPJ) combines two powder spreaders and a single print unit to spread metal powder and to print a structure in a single pass with apparently no wasted motion. As another illustration, electron beam additive manufacturing processes use an electron beam to deposit metal via wire feedstock or sintering on a powder bed in a vacuum chamber. Single Pass Jetting is another exemplary technology claimed by its developers to be much quicker than conventional laser-based systems. Atomic Diffusion Additive Manufacturing (ADAM) is still another recently developed technology in which components are printed, layer-by-layer, using a metal powder in a plastic binder. After printing, plastic binders are removed and the entire part is sintered at once into a desired metal.

Figure 1:
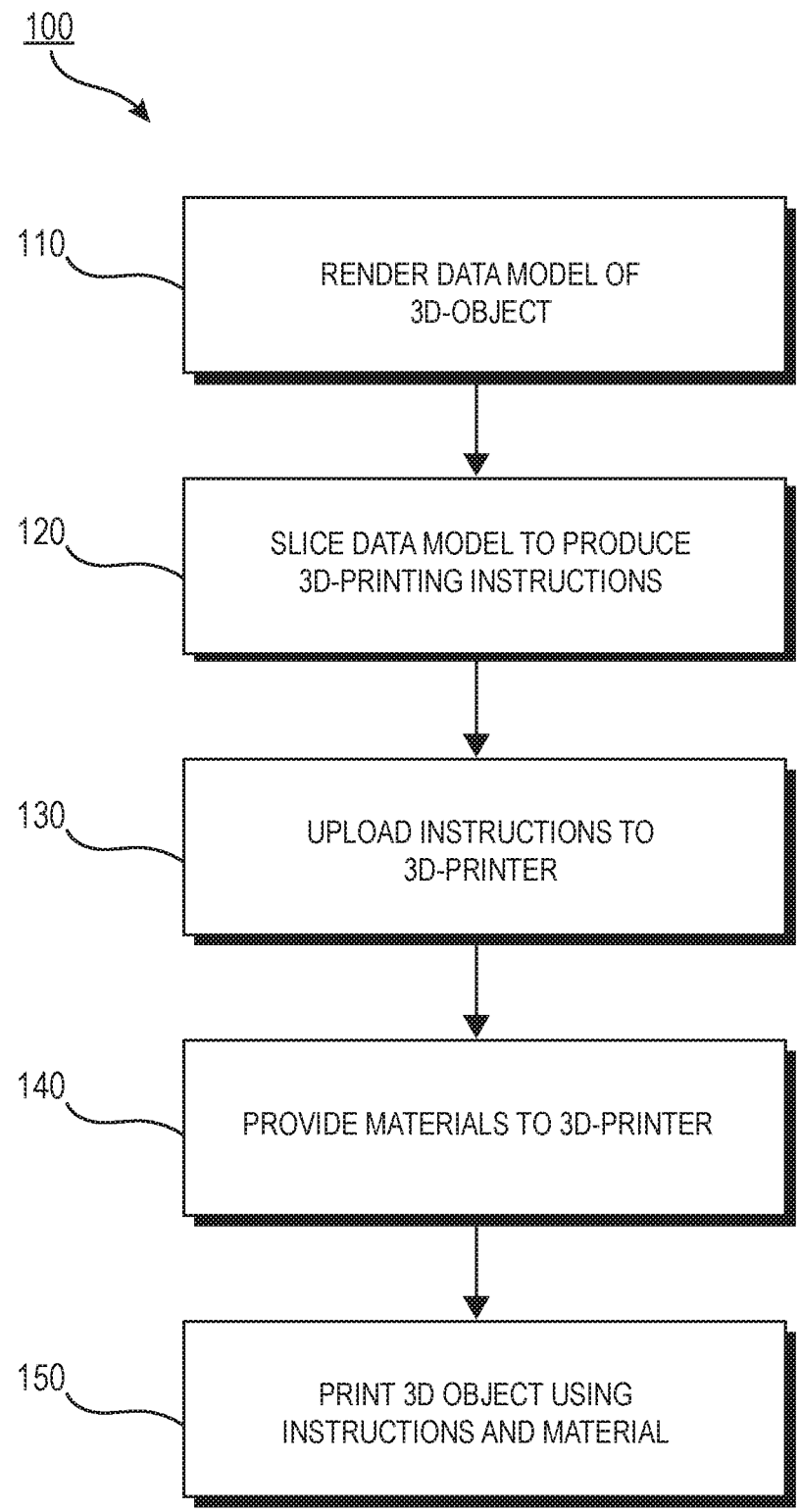
FIG. 1 is a flow diagram of an AM process.

FIG. 1 is a flow diagram 100 of an AM process. A data model of the desired 3-D object to be printed is rendered (step 110). A data model is a virtual design of the 3-D object. Thus, the data model may reflect the geometrical and structural features of the 3-D object, as well as its material composition. The data model may be created using a variety of methods, including CAE-based optimization, 3D modeling, photogrammetry software, and camera imaging. CAE-based optimization may include, for example, cloud-based optimization, fatigue analysis, linear or non-linear finite element analysis (FEA), and durability analysis.

3-D modeling software, in turn, may include one of numerous commercially available 3-D modeling software applications. Data models may be rendered using a suitable computer-aided design (CAD) package, for example in an STL format. STL (stereolithography) is one example of a file format associated with commercially available stereolithography-based CAD software. A CAD program may be used to create the data model of the 3-D object as an STL file. Thereupon, the STL file may undergo a process whereby errors in the file are identified and resolved.

Following error resolution, the data model can be "sliced" by a software application known as a slicer to thereby produce a set of instructions for 3-D printing the object, with the instructions being compatible and associated with the particular 3-D printing technology to be utilized (step 120). Numerous slicer programs are commercially available. Generally, the slicer program converts the data model into a series of individual layers representing thin slices (e.g., 100 microns thick) of the object be printed, along with a file containing the printer-specific instructions for 3-D printing these successive individual layers to produce an actual 3-D printed representation of the data model.

The layers associated with 3-D printers and related print instructions need not be planar or identical in thickness. For example, in some embodiments depending on factors like the technical sophistication of the 3-D printing equipment and the specific manufacturing objectives, etc., the layers in a 3-D printed structure may be non-planar and/or may vary in one or more instances with respect to their individual thicknesses. For example, in some exemplary embodiments, a build piece may be additively manufactured using PBF, after which DMD may be applied to change a region of the build piece using a non-flat layer structure and/or layers having different thicknesses.

A common type of file used for slicing data models into layers is a G-code file, which is a numerical control programming language that includes instructions for 3-D printing the object. The G-code file, or other file constituting the instructions, is uploaded to the 3-D printer (step 130). Because the file containing these instructions is typically configured to be operable with a specific 3-D printing process, it will be appreciated that many formats of the instruction file are possible depending on the 3-D printing technology used.

In addition to the printing instructions that dictate what and how an object is to be rendered, the appropriate physical materials necessary for use by the 3-D printer in rendering the object are loaded into the 3-D printer using any of several conventional and often printer-specific methods (step 140). In DMD techniques, for example, one or more metal powders may be selected for layering structures with such metals or metal alloys. In selective laser melting (SLM), selective laser sintering (SLS), and other PBF-based AM methods (see below), the materials may be loaded as powders into chambers that feed the powders to a build platform. Depending on the 3-D printer, other techniques for loading printing materials may be used.

The respective data slices of the 3-D object are then printed based on the provided instructions using the material(s) (step 150). In 3-D printers that use laser sintering, a laser scans a powder bed and melts the powder together where structure is desired, and avoids scanning areas where the sliced data indicates that nothing is to be printed. This process may be repeated thousands of times until the desired structure is formed, after which the printed part is removed from a fabricator. In fused deposition modelling, as described above, parts are printed by applying successive layers of model and support materials to a substrate. In general, any suitable 3-D printing technology may be employed for purposes of this disclosure.

Another AM technique includes powder-bed fusion ("PBF"). Like DMD, PBF creates 'build pieces' layer-by-layer. Each layer or 'slice' is formed by depositing a layer of powder and exposing portions of the powder to an energy beam. The energy beam is applied to melt areas of the powder layer that coincide with the cross-section of the build piece in the layer. The melted powder cools and fuses to form a slice of the build piece. The process can be repeated to form the next slice of the build piece, and so on. Each layer is deposited on top of the previous layer. The resulting structure is a build piece assembled slice-by-slice from the ground up.

FIGS. 2A-D illustrate respective side views of an exemplary PBF system 200 during different stages of operation. As noted above, the particular embodiment illustrated in FIGS. 2A-D is one of many suitable examples of a PBF system employing principles of this disclosure. It should also be noted that elements of FIGS. 2A-D and the other figures in this disclosure are not necessarily drawn to scale, but may be drawn larger or smaller for the purpose of better illustration of concepts described herein. PBF system 200 can include a depositor 201 that can deposit each layer of metal powder, an energy beam source 203 that can generate an energy beam, a deflector 205 that can apply the energy beam to fuse the powder, and a build plate 207 that can support one or more build pieces, such as a build piece 209. PBF system 200 can also include a build floor 211 positioned within a powder bed receptacle. The walls of the powder bed receptacle 212 generally define the boundaries of the powder bed receptacle, which is sandwiched between the walls 212 from the side and abuts a portion of the build floor 211 below. Build floor 211 can progressively lower build plate 207 so that depositor 201 can deposit a next layer. The entire mechanism may reside in a chamber 213 that can enclose the other components, thereby protecting the equipment, enabling atmospheric and temperature regulation and mitigating contamination risks. Depositor 201 can include a hopper 215 that contains a powder 217, such as a metal powder, and a leveler 219 that can level the top of each layer of deposited powder.

Figure 2A:
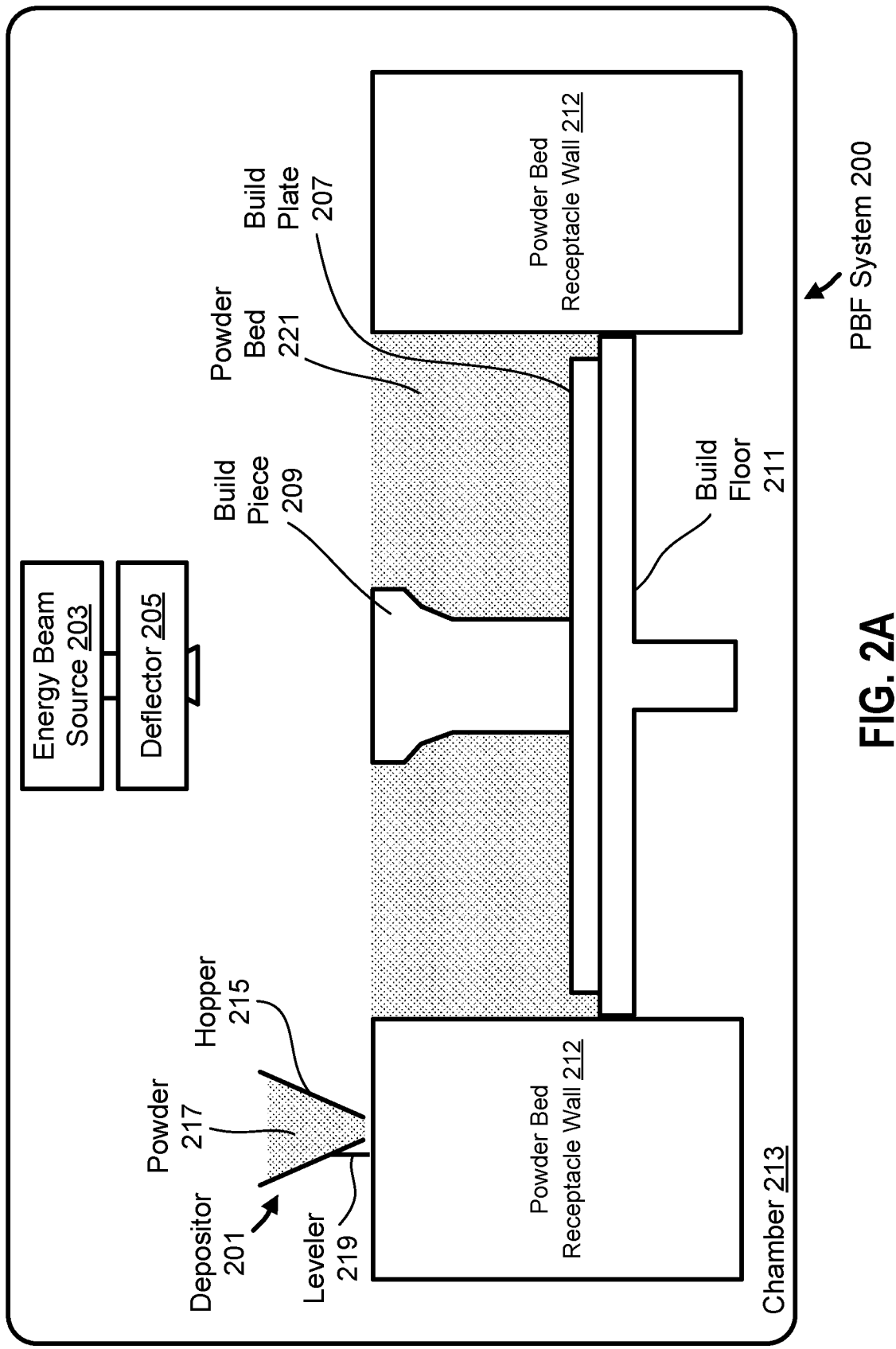
FIGS. 2A-D are side views of an exemplary PBF 3-D printer in operation.

Referring specifically to FIG. 2A, this figure shows PBF system 200 after a slice of build piece 209 has been fused, but before the next layer of powder has been deposited. In fact, FIG. 2A illustrates a time at which PBF system 200 has already deposited and fused slices in multiple layers, e.g., 150 layers, to form the current state of build piece 209, e.g., formed of 150 slices. The multiple layers already deposited have created a powder bed 221, which includes powder that was deposited but not fused.

Figure 2B:
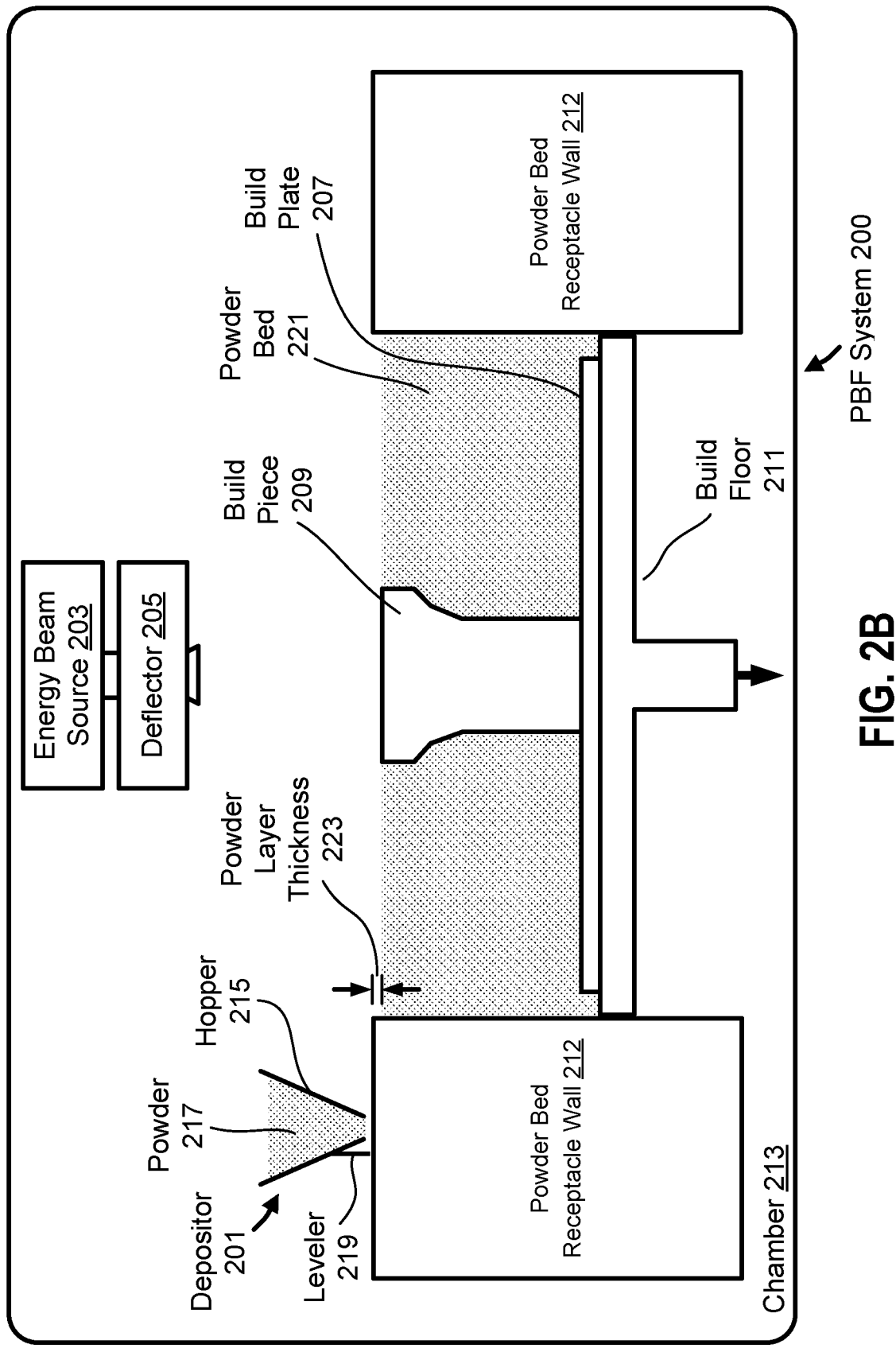

FIG. 2B shows PBF system 200 at a stage in which build floor 211 can lower by a powder layer thickness 223. The lowering of build floor 211 causes build piece 209 and powder bed 221 to drop by powder layer thickness 223, so that the top of the build piece and powder bed are lower than the top of powder bed receptacle wall 212 by an amount equal to the powder layer thickness. In this way, for example, a space with a consistent thickness equal to powder layer thickness 223 can be created over the tops of build piece 209 and powder bed 221.

Figure 2C:
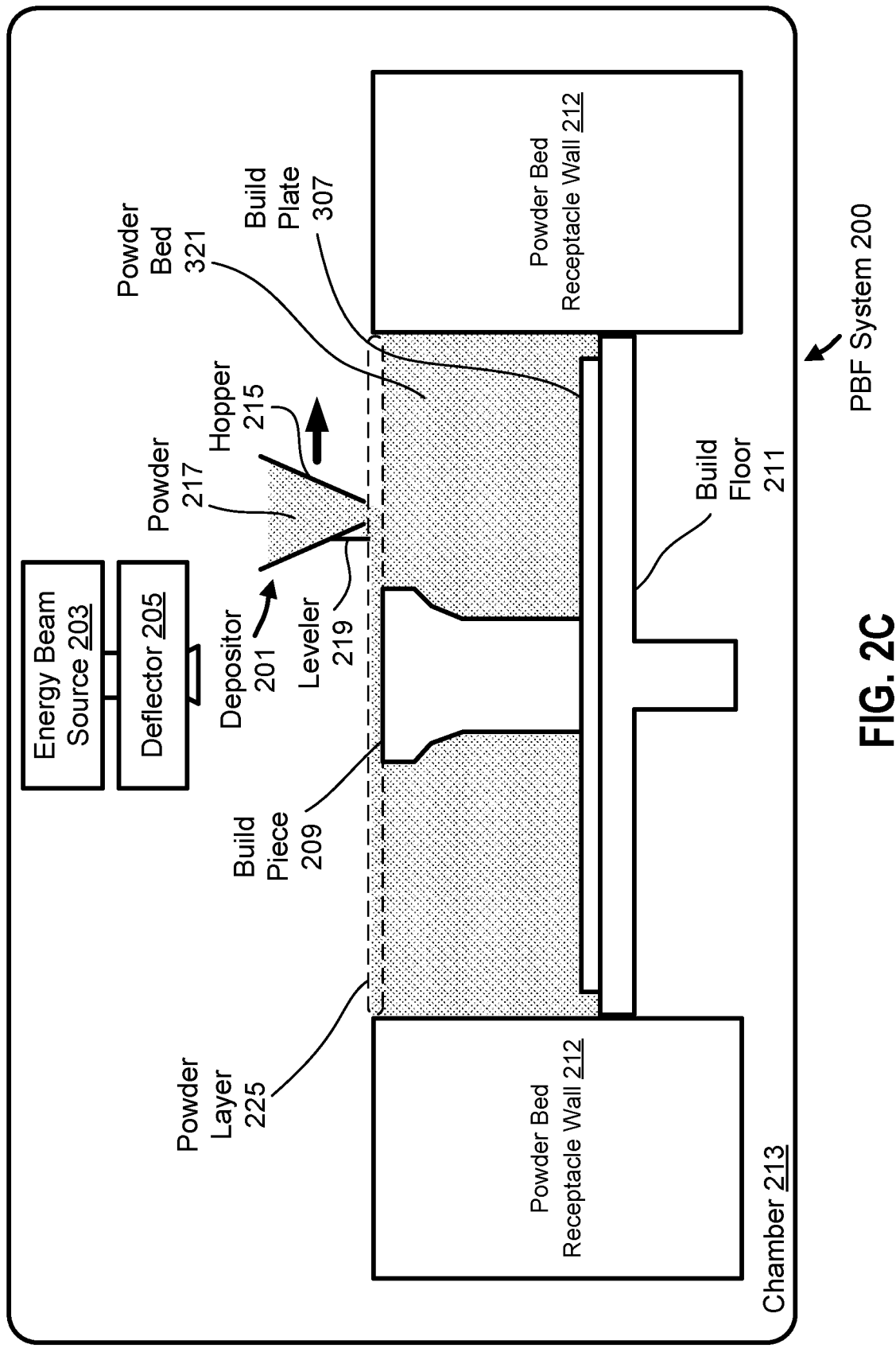

FIG. 2C shows PBF system 200 at a stage in which depositor 201 is positioned to deposit powder 217 in a space created over the top surfaces of build piece 209 and powder bed 221 and bounded by powder bed receptacle walls 212. In this example, depositor 201 progressively moves over the defined space while releasing powder 217 from hopper 215. Leveler 219 can level the released powder to form a powder layer 225 that has a thickness substantially equal to the powder layer thickness 223 (see FIG. 2B). Thus, the powder in a PBF system can be supported by a powder support structure, which can include, for example, a build plate 207, a build floor 211, a build piece 209, walls 212, and the like. It should be noted that the illustrated thickness of powder layer 225 (i.e., powder layer thickness 223 (FIG. 2B)) is greater than an actual thickness used for the example involving 150 previously-deposited layers discussed above with reference to FIG. 2A.

Figure 2D:
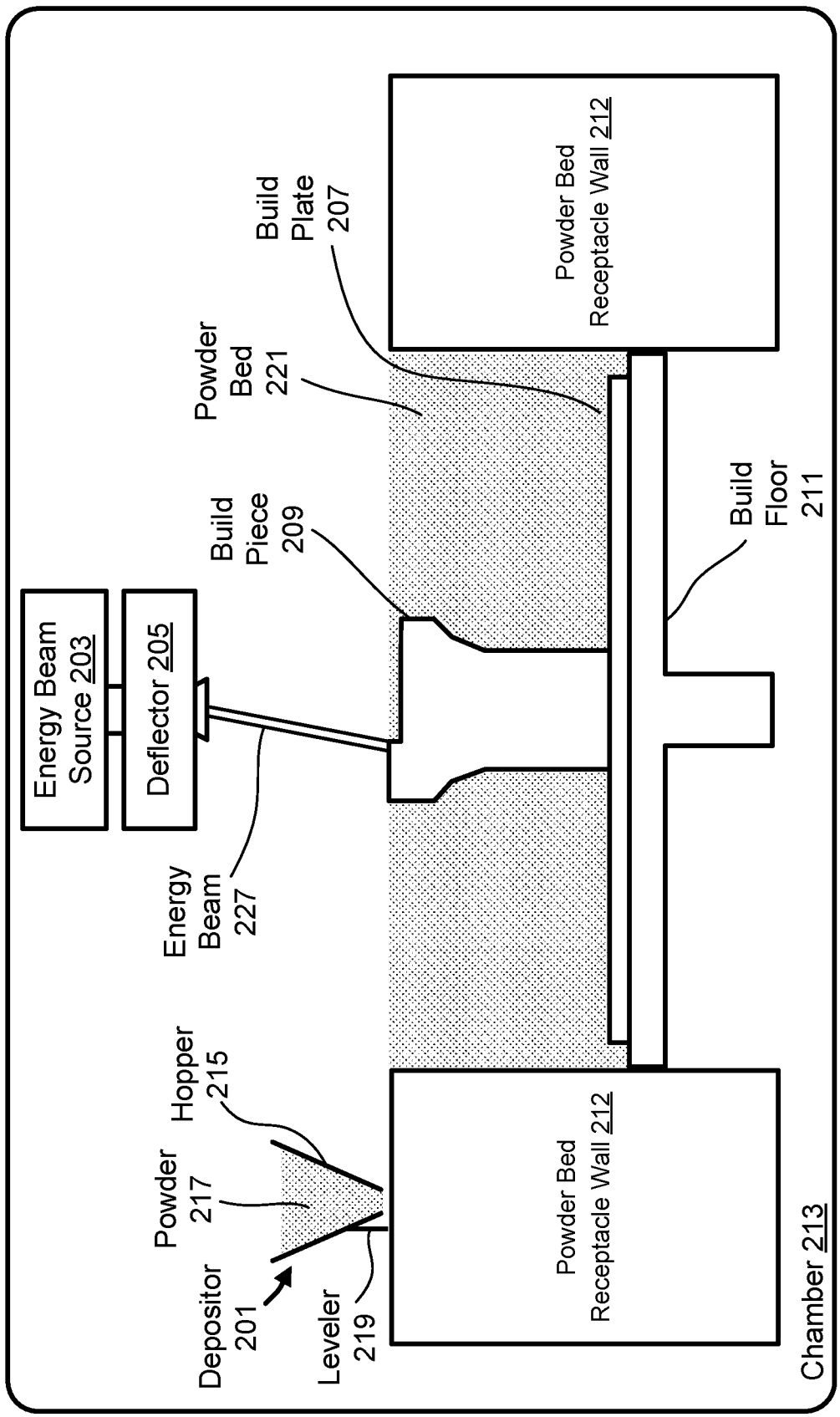

FIG. 2D shows PBF system 200 at a stage in which, following the deposition of powder layer 225 (FIG. 2C), energy beam source 203 generates an energy beam 227 and deflector 205 applies the energy beam to fuse the next slice in build piece 209. In various exemplary embodiments, energy beam source 203 can be an electron beam source, in which case energy beam 227 constitutes an electron beam. Deflector 205 can include deflection plates that can generate an electric field or a magnetic field that selectively deflects the electron beam to cause the electron beam to scan across areas designated to be fused. In various embodiments, energy beam source 203 can be a laser, in which case energy beam 227 is a laser beam. Deflector 205 can include an optical system that uses reflection and/or refraction to manipulate the laser beam to scan selected areas to be fused.

In various embodiments, the deflector 205 can include one or more gimbals and actuators that can rotate and/or translate the energy beam source to position the energy beam. In various embodiments, energy beam source 203 and/or deflector 205 can modulate the energy beam, e.g., turn the energy beam on and off as the deflector scans so that the energy beam is applied only in the appropriate areas of the powder layer. For example, in various embodiments, the energy beam can be modulated by a digital signal processor (DSP).

Multi-material components. Many manufactured structures incorporate multiple materials. These structures can be produced using conventional manufacturing techniques such as the use of adhesives or mechanical attachments (screws, clamps, etc.). Alternatively, the structure can be additively manufactured using a first material, and thereafter the structure can be printed using another material or can be combined with one or more additional materials using conventional techniques such as adhesives or mechanical attachments.

Another possible solution involving AM is to construct a 3-D printer that includes multiple depositors as described in Applicant's co-pending patent application Ser. No. 15/582,485, which is incorporated by reference herein in its entirety. Based on a data model of a structure, a controller causes layers of different powders to be deposited in different regions of a build piece. The controller can also instruct the depositors to deposit overlapping powders of two different materials in the same region of one or more layers. The ratio of the deposited material can be varied to create mixed materials having different properties. The different materials can thereafter be fused and solidified. The disclosed subject matter advantageously enables a 3-D printer to print parts having a combination of materials.

In an aspect of the present disclosure, a 3-D printer includes a plurality of containers, such as cartridges. Each container may include a slurry within which a print material is suspended. Each container may be coupled to a respective print head or nozzle. Alternatively, the different container may be coupled to a single print head including a primary nozzle. The nozzles are configured to deposit droplets of the slurry from a container in selected regions within a layer, responsive to controller instructions based on a 3-D data model of the part. The controller may issue commands to cause the print container to deposit multiple print materials in the same region of a layer, or in different areas.

In an embodiment, the print material is a metal element or a metal alloy. In another embodiment, each print material is a different element of a metal alloy. The controller may be configured to deposit droplets on the layer or plurality of layers in amounts proportional to a desired metal alloy composition. After the 3-D printer deposits a layer, the droplets are sintered using an energy source such as a laser. The liquid in the slurry may evaporate from the heat. Following evaporation, the print materials may be solidified at the relevant regions of the layer and/or may undergo one or more chemical reactions at the regions to combine into another substance, such as a metal alloy including a predetermined percentage of constituent elements. After the sintering, the nozzles may deposit a new layer in a similar fashion, in accordance with controller instructions. In an alternative embodiment, the slurry may be drained out instead of or in addition to being evaporated.

Figure 3:
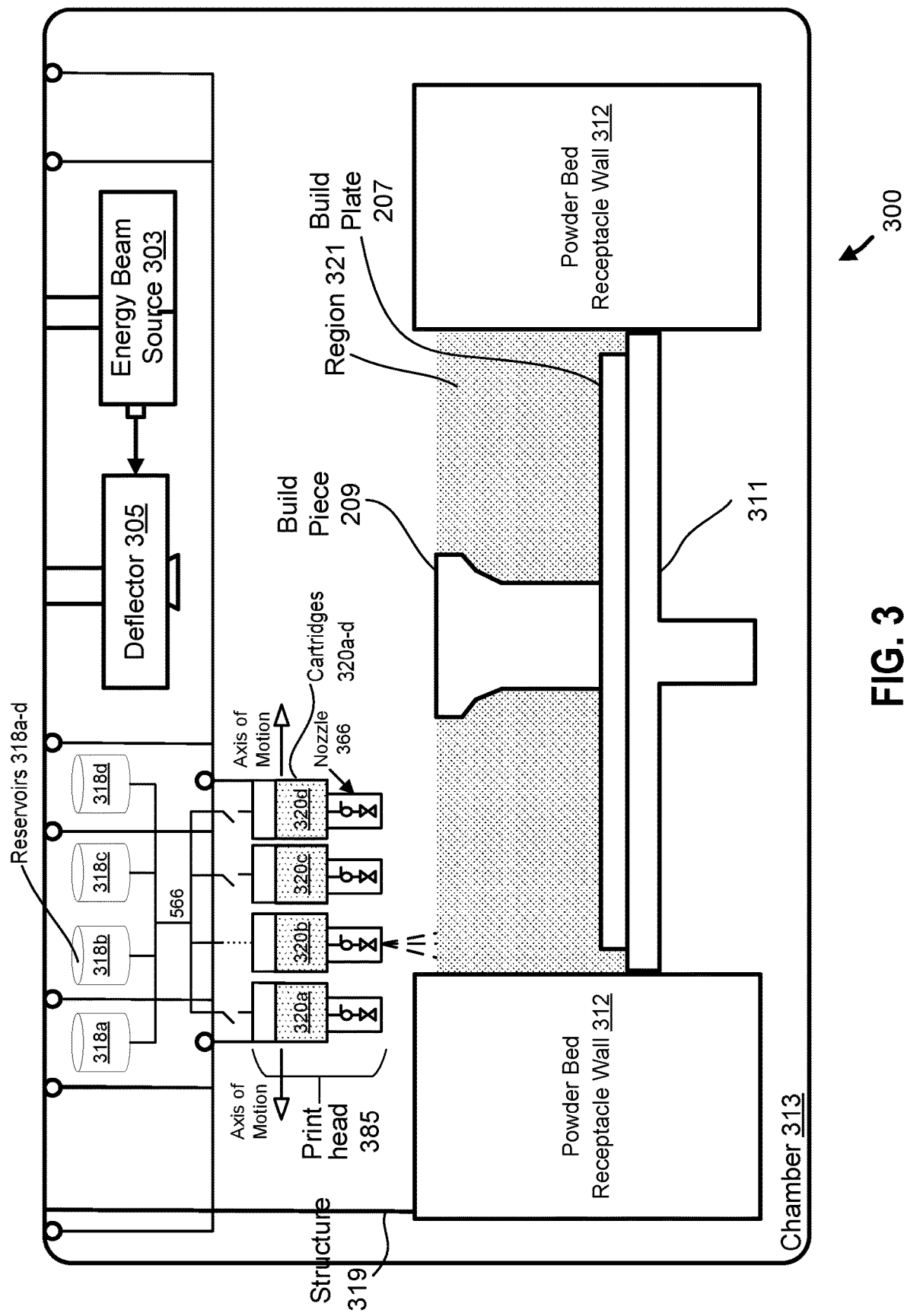
FIG. 3 is a front view of a 3-D printer in accordance with an aspect of the disclosure.

FIG. 3 is a front view of a 3-D printer 300 in accordance with an aspect of the disclosure. The PBF system 300 includes chamber 313 having an energy beam source 303 coupled to an upper surface of the printer body 330. The energy beam source 303 is operable to transmit an energy beam to deflector 305, also coupled to the body 330, during the sintering stages. FIG. 3, however, shows an embodiment of the deposition stage prior to the sintering stage. The chamber 313 also includes build floor 311, build plate 207 on build floor 311, and slurry bed receptacle walls 312 that are coupled to the body 330 via structure 319 and that provide a vertical perimeter around the build floor 311.

3-D printer 300 includes a plurality of containers, e.g., cartridges 320a-d. In an embodiment, each cartridge includes a slurry having a different chemical element. In another embodiment, the chemical element is one component of a metal alloy. In still another embodiment, each cartridge includes a slurry having a metal alloy. In various embodiments, additional cartridges may include water or another substance. Alternatively, 3-D printer 300 may include one or more depositors (FIGS. 2A-D) for depositing one or more powder in accordance with certain embodiments.

Each cartridge 320a-d may be associated with a respective reservoir 318a-d in which an additional store of solution may be maintained and supplied as necessary to any of cartridges 320a-d via a tube or manifold network 367. In some embodiments, the reservoirs 318a-d are separate from the 3-D printer 300. In other embodiments, reservoirs 318a-d are not used. Cartridges 320a-d may be replaceable such that when one cartridge is empty as reflected, e.g., by an indicator light on the 3-D printer 300, the cartridge may be removed and a substitute cartridge may be inserted in its place.

Each cartridge may be coupled to a respective nozzle 366. The nozzle 366 is configured to receive the slurry from the cartridge and to eject controlled droplets as required, during a re-coat cycle (i.e., before a print or sintering cycle). The combination of cartridges 320a-d and nozzles 366 acts as a print head 385 configured to move across an x-y plane parallel to the build floor 311 such that any nozzle 366 of print head 385 may be configured to eject droplets at any point within the area of the build plate 207. In various embodiments, the reservoirs 320a-d may be simultaneously coupled via the tube/manifold network 367 to their respective cartridges 320a-d, and each cartridge 320a-d may concurrently eject a different material. In other embodiments, cartridges can be coupled to a single nozzle, for example, and the single nozzle can be controlled to eject slurry from a single cartridge at a time. As shown in FIG. 3, cartridge 320b is connected via tube/manifold network to its respective reservoir 318b, and cartridge 320b feeds its nozzle 366 to eject a material at one instance in time. In some embodiments, the print head 385 can remain stationary while sequentially dispensing different materials. In various embodiments, all cartridges 320a-d may be simultaneously ejecting their respective materials via nozzles 366.

The region 321 between slurry bed receptacle walls 312 may have different compositions depending on the embodiment. In various embodiments, the entire layer may be filled with a slurry of print material, with the selected portions of the layer sintered and with the remaining portions drained off or otherwise removed. In one embodiment, the print head 385 deposits a layer by selectively ejecting droplets only in regions that will be printed. In this embodiment, region 321 may be vacant. In other embodiments, the print head 385 may deposit a fluid without containing any print material.

Thus, region 321 may include the fluid, which can be drained off or evaporated as necessary. Alternatively, the print head 385 may deposit a substance which, when sintered, forms a support material (see, e.g. FIG. 4). In that event, portions of region 321, or portions internal to the build piece, may be populated with support material, with other portions vacant or including a fluid. In some embodiments, a powder can be deposited in region 321.

In an embodiment, the print head 385 may selectively deposit a layer of the solution, which may include print materials from one or more cartridges 320a-d. After the layer is deposited, the energy beam source 303, such as a laser, may initially evaporate the fluid, and thereafter sinter the print materials. Alternatively, as noted above, the print head 385 may deposit the new layer, after which the fluid is drained. In another embodiment, the print bed may be heated to vaporize the fluid as it is deposited by the lower temperature print head. The laser then selectively sinters regions of the layer.

The slurry may include a small amount of liquid with a metal print material, such as aluminum or copper. In the case of cartridges 320a-d, they may include aluminum, silicon, magnesium, and copper. The controller can deposit different materials in an overlapping portion in the same region such that a desired proportion of elements of a metal alloy can be obtained when the different materials are fused. For example, the print head 385 can use cartridge 320a to deposit via its nozzle 366 a relative amount of 90% aluminum, cartridge 320b to deposit via its nozzle 366 a relative amount of 8% silicon, and cartridge 320c to deposit via its nozzle 2% magnesium such that, when fused, a local alloy results with the same 90/8/2 percent proportions. In various embodiments, each of the four nozzles 366, or any of the four, can be concurrently spraying material to contribute its relative amount of alloy. In other embodiments, the alloys may be mixed prior to being dispensed via one or more nozzles 366. In an embodiment, at an instance in time cartridge 320b is shown to deposit aluminum. In some embodiments, each cartridge 320a-d may be concurrently depositing their respective elements. In these embodiments, reservoirs 320a-d may dynamically connect to cartridges that need additional material, or they may all be simultaneously connected to their respective cartridges via the tube/manifold network.

Based on controller instructions, the print head 385 can vary the desired percentage of an alloy continuously across a layer, which in turn, can vary the characteristics of the resulting build piece. For example, $AlSi_{10}Mg$ may be used. If greater strength is desired in one region, the amount of Magnesium deposited in that region can be increased proportionately. Conversely, if greater ductility is desired in that region, the amount of Magnesium can be proportionately decreased. During the design phase of the manufacturing process, the desired material characteristics at different regions of a part, and hence the alloy composition at those regions, can be precisely determined.

The carrier fluid may be a non-flammable solvent. For example, benzene may be used as the carrier fluid, although various other solvents are possible. Different embodiment-specific metals may be used in the slurry, such as steel titanium, aluminum, or alloy variants thereof. In an embodiment, the cartridges 320a-d may have slurries of other print materials different from those indicated above. In various embodiments, each slurry can have a different print material than each of the other slurries, as in the example above in which cartridges 320a-d include print material elements of aluminum, silicon, magnesium, and copper, respectively. In various embodiments, the different print materials in the cartridges can be different mixtures that include print material elements in common with the other mixtures. For example, one cartridge could have a mixture of aluminum and titanium, and another cartridge could have a mixture of titanium and silicon, e.g., each print material includes titanium, but also includes a different print material element (aluminum or silicon in this example). In various embodiments, the different print materials in the cartridges could be mixtures of the same print material elements, but in different proportions. For example, one cartridge could have a 10-to-1 mixture of aluminum and silicon, and another cartridge could have a 1-to-1 mixture of aluminum and silicon.

The configuration of the nozzles 366, cartridges 320a-d and the print head 385 may be arranged in a variety of different ways and are not intended to be limiting. For example, a single print head may correspond to a single nozzle in certain embodiments. Also, the number of print heads need not coincide with the number of nozzles or cartridges. In some embodiments, the slurries from different cartridges can be dispensed using a single nozzle. In addition, more than one energy beam source 303 may be used, whereby each of the different energy beam sources may target a different region. In addition to lasers, the energy beam source may include electric arcs, diodes, and the like.

Figure 4:
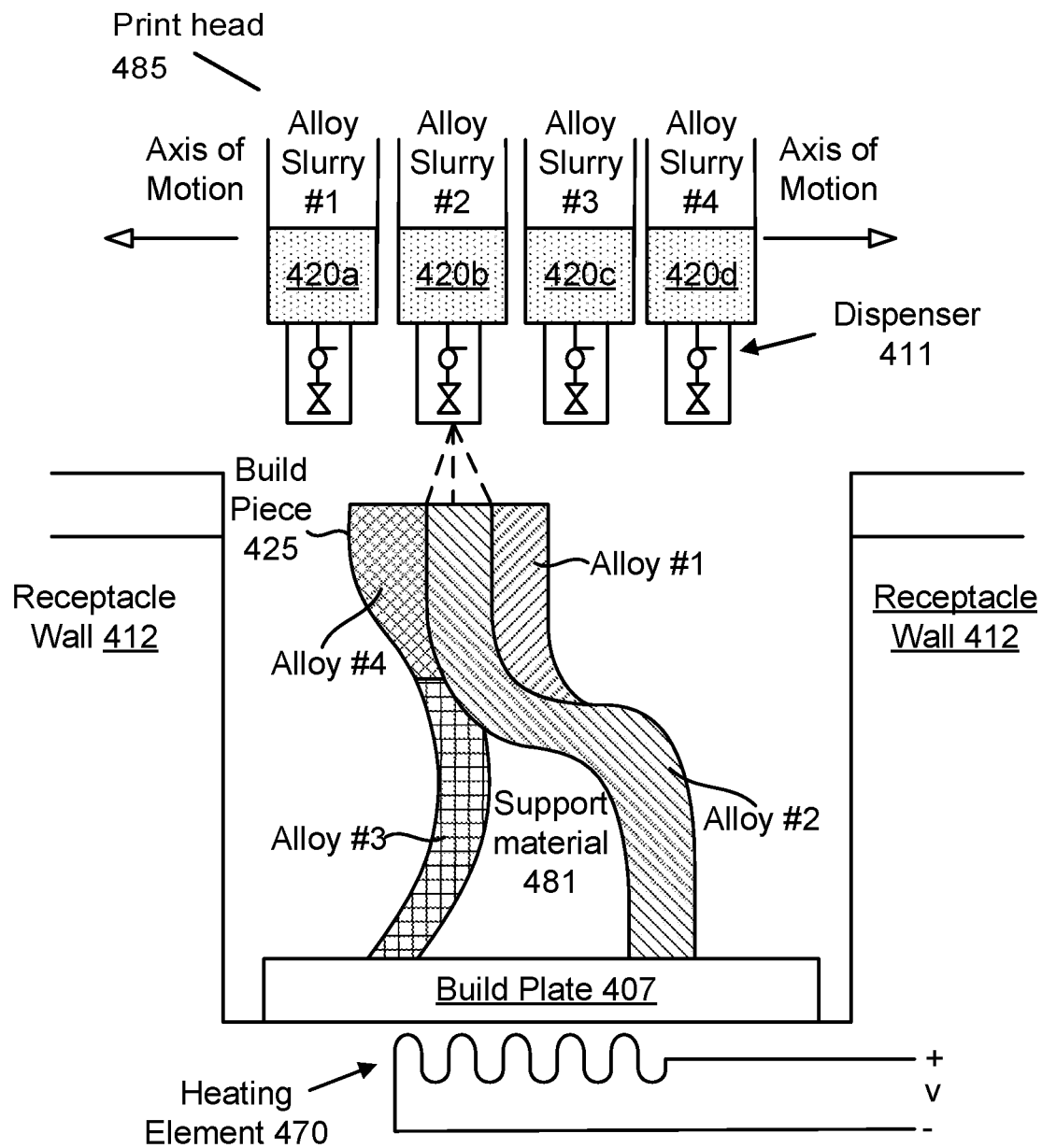
FIG. 4 is a view of a plurality of cartridges in a 3-D printer depositing different alloys to form a build piece in accordance with an aspect of the disclosure.

FIG. 4 is a view of a plurality of containers, e.g., cartridges 420a-d in a 3-D printer depositing different alloys to form a build piece in accordance with an aspect of the disclosure. In this embodiment, each cartridge 420a-d includes a slurry having a different metal alloy. Thus, each of the four nozzles 466 can deposit a unique metal alloy onto build plate 407. As with the print head 385 of FIG. 3, print head 485 moves in an x-y direction such that its nozzles 466 can each access any point within the area of build plate 407. It should be noted that while one bi-directional axis of motion is shown in the figure, the print head 485 may also be moveable in a direction perpendicular to the plane of the drawing. In some embodiments, the print head 486 may be capable of diagonal movement. Further, the print head 485, or individual nozzles 466 thereof, may also be capable of rotation in order to selectively deposit the droplets from an angle.

A heating element 470 is also shown in FIG. 4. In an embodiment, heating element 470 vaporizes the carrier fluid as it drops from a nozzle 466. For clarity, the energy beam source is omitted from the figure; however, the remaining alloy may be solidified by the laser or other energy beam after vaporization of the carrier fluid.

The embodiment shows a build piece 425 composed of four alloys, Alloy #1, Alloy #2, Alloy #3, and Alloy #4. The build piece 425 includes distinct combinations of the four alloys. The alloys can also be mixed as described above relative to FIG. 3 to create new compositions with desired properties.

In some embodiments it may be necessary to include support material 481 in order to maintain the build piece 425 in a vertical position and to avoid deformation due to gravity. In an embodiment, support material 481 may be provided by a separate cartridge and included with the necessary regions of build piece 425. The support material 481 is typically brittle and easy to segregate from the build piece 425 upon completion of the 3-D print. The support material 481 in various embodiments may include lattice-type or honeycomb structures to save material while maintaining adequate support.

As with previous embodiments, the containers 420a-d of print head 485 may be replaceable such that virtually any desired print material conducive to solidification by the energy source may be used. The cartridges may be inserted into and held by a conventionally known interface used for the print head 485. Any suitable architecture may be used, particularly one that facilitates access to and ease of replacing containers 420a-d.

Figure 5:
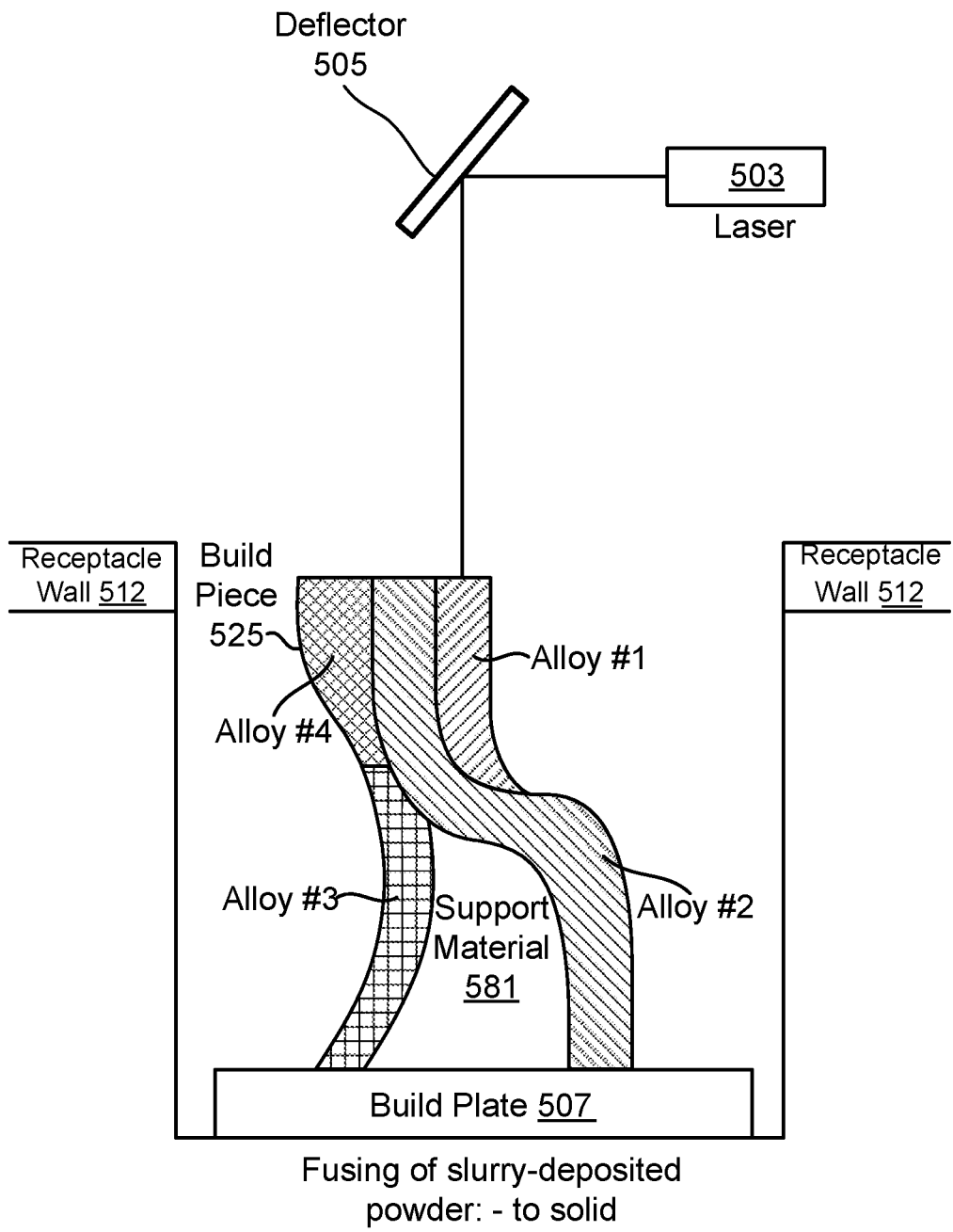
FIG. 5 is a view of a laser-based fusion of the alloy material in a 3-D printer in accordance with an aspect of the disclosure.

FIG. 5 is a view of a laser-based fusion of the alloy material in a 3-D printer in accordance with an aspect of the disclosure. Following the deposition of a layer including one or more of the four illustrated alloys #1-4, the carrier fluid is vaporized as described above such that only the slurry-deposited powder remains. In an embodiment, the laser itself conducts the vaporization, whether alone or in conjunction with a heating element. For example, the laser may immediately follow the print head 485 (FIG. 4) in operation, vaporizing the fluid in lieu of suspending operation until after the layer is deposited. In other embodiments, the heating element is sufficient to enable the fluid to evaporate, and laser 503 remains idle until the slurry layer is deposited. Laser 503 uses deflector 505, each operated via instructions from the controller, to fuse the powder into solid form to thereby create the build piece 525. Like in FIG. 4, the build piece 525 includes four allows and optional support material 581.

Figure 6:
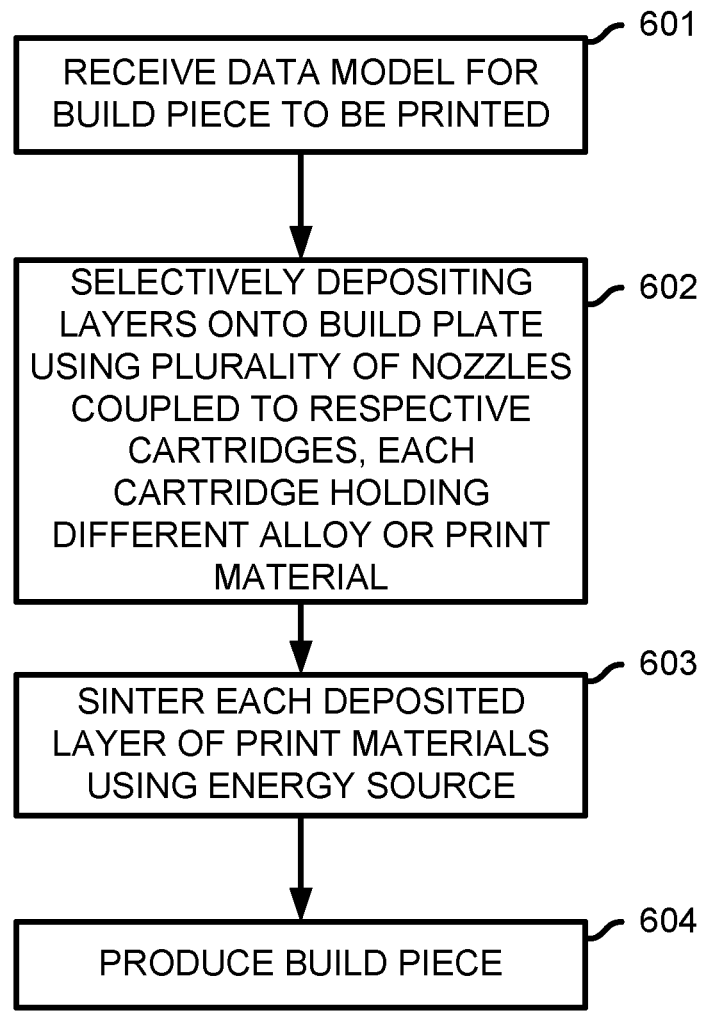
FIG. 6 is a flow diagram illustrating an example of a 3-D print operation in accordance with an aspect of the disclosure.

FIG. 6 is a flow diagram illustrating an example of a 3-D print operation in accordance with an aspect of the disclosure. A computer aided design (CAD) application suite may be used to generate a 3-D data model representing the architecture of a part to be 3-D printed. In addition to the general 3-D attributes of the part (e.g., its shape and internal configuration), the data model may specify the type of material used at every point in the structure defined by the model. Thus at 601, the 3-D printer may receive a data model for a build piece to be printed. The data model may, in some embodiments, be in the form of pre-compiled instructions that the controller of the 3-D printer can immediately execute.

In response to controller commands, the 3-D printer at 602 operates the print head to selectively deposit layers onto the printer build plate. In an embodiment, the print head includes a plurality of nozzles coupled to respective cartridges, each cartridge holding a different alloy or print material. The print material may be an element, such as a metal, or a combination of elements, such as a metal alloy or other substance in molecular form.

At 603, the carrier fluid corresponding to the deposited slurry is evaporated. The vaporization may be caused by the energy source (e.g., laser) itself or by a separate heating element operating at the base of the slurry bed. In an embodiment, the carrier fluid in the droplets of slurry vaporizes as it makes contact with the heated slurry bed, leaving just the particles from the slurry to be sintered and solidified. In another embodiment, the laser vaporizes the carrier fluid in the slurry.

At 604, the laser or other energy beam source sinters each deposited layer to solidify the material into its final form. The deposition process (602) next continues as the next layer is deposited and the process is repeated until the build piece is complete (605).

The previous description is provided to enable any person skilled in the art to practice the various aspects described herein. Various modifications to the exemplary embodiments presented throughout this disclosure will be readily apparent to those skilled in the art, and the concepts disclosed herein may be applied to other solar vehicles and for techniques for additively manufacturing structures within solar vehicles. Thus, the claims are not intended to be limited to the exemplary embodiments presented throughout the disclosure, but are to be accorded the full scope consistent with the language claims. All structural and functional equivalents to the elements of the exemplary embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for".

What is claimed is:

1. A three-dimensional (3D) printer, comprising:
   a build plate to support a build piece;
   a plurality of containers, each container including a slurry including a different print material;
   one or more nozzles, each nozzle coupled to one or more of the plurality of containers;
   at least one energy source; and
   a controller configured to control the one or more nozzles to deposit a layer by selectively depositing, by spraying, one or more of the different print materials in one or more regions of the layer based on a 3-D data model of the build piece, and to control the at least one energy source to selectively sinter at least a portion of the one or more different print materials in the one or more regions of the layer to produce the build piece,
   wherein at least one of the one or more nozzles rotates such that the layer is selectively deposited from an angle with respect to a vertical axis.

2. The 3D printer of claim 1, wherein the one or more nozzles includes a plurality of nozzles arranged on different portions of a print head that moves in accordance with instructions from the controller.

3. The 3D printer of claim 1, wherein the one or more nozzles includes a plurality of nozzles, the 3D printer further comprising a plurality of print heads, wherein,
   one or more of the plurality of nozzles are built into each of the plurality of print heads and the plurality of print heads move in accordance with instructions from the controller.

4. The 3D printer of claim 1, wherein
   at least one of the plurality of containers comprises a slurry including a solvent in which the different print material is present; and
   the slurry is deposited in response to the controller's direction.

5. The 3D printer of claim 4, wherein the solvent comprises benzene.

6. The 3D printer of claim 4, further comprising a heating element configured to vaporize the solvent prior to sintering the one or more different print materials.

7. The 3D printer of claim 4, wherein the controller is configured to evaporate the deposited solvent by heating the build plate to a designated temperature.

8. The 3D printer of claim 1, wherein at least one of the plurality of containers contains a powder, the powder comprising the different print material.

9. The 3D printer of claim 1, wherein the different print materials comprise an alloy.

10. The 3D printer of claim 1, wherein at least one of the different print materials comprises an elementary metal.

11. The 3D printer of claim 1, wherein the deposition of a layer comprises:
    directing the one or more nozzles to deposit designated portions of the different print materials into the one or more of the regions to produce a layer of material having different properties at different portions.

12. The 3D printer of claim 11, wherein the controller is directed to produce the build piece comprising an alloy having a composition that differs in different areas.

13. The 3D printer of claim 12, wherein the difference in composition is continuous.

14. The 3D printer of claim 1, wherein the at least one energy source comprises a laser.

15. The 3D printer of claim 1, wherein the at least one energy source comprises an electric arc.

16. The 3D printer of claim 1, wherein the deposition of a layer comprising the one or more different print materials comprises varying amounts of the different print materials as a function of time, position, or both.

17. A three-dimensional (3-D) printer, comprising:
    a chamber having a build plate and at least one energy source;
    a plurality of cartridges, each cartridge comprising a slurry having a different print material;
    at least one print head comprising a plurality of nozzles, each nozzle coupled to one of the plurality of cartridges; and
    a controller configured to direct the at least one print head to selectively deposit, by spraying, the one or more different print materials layer-by-layer in one or more regions of each layer based on a 3-D data model of a build piece and to selectively sinter the one or more different print materials using the at least one energy source,
    wherein at least one of the one or more nozzles rotates such that the layer is selectively deposited from an angle with respect to a vertical axis.

18. The 3-D printer of claim 17, wherein the controller is further configured to deposit the different print materials in amounts that result in different alloys of an identical substance in different regions of at least one layer or different regions of the build piece.

19. The 3-D printer of claim 17, wherein the different alloys change as a function of position on the layer, on the build piece, or both.

20. The 3-D printer of claim 19, wherein the difference is one of discrete or continuous.

21. The 3-D printer of claim 17, wherein the different print material in at least one cartridge is present in a slurry including a solvent.

22. The 3-D printer of claim 21, further comprising a heating element configured to vaporize the solvent prior to sintering the one or more different print materials.

23. The 3D printer of claim 1, wherein the deposition of a layer comprises varying the percentage of the one or more different print materials deposited in the slurry.

24. The 3D printer of claim 1, wherein the deposition of a layer comprises depositing one or more of the different print materials in an overlapping portion in a region to obtain a desired proportion of a metal alloy when the different print materials are sintered.

25. The 3D printer of claim 17, wherein each cartridge is configured to dynamically connect to a reservoir.

* * * * *